(12) United States Patent
Ramakrishnan et al.

(10) Patent No.: US 8,700,832 B1
(45) Date of Patent: Apr. 15, 2014

(54) AUTOMATED ADDITION OF FILE BASED HARDWARE AND FILE BASED ACCESS SERVICES IN A DATA STORAGE SYSTEM

(75) Inventors: Ashok Ramakrishnan, Morrisville, NC (US); Mohamed Elayouty, Cary, NC (US); Phillip Leef, Brookline, MA (US); Russell R. Laporte, Webster, MA (US); Ping He, Cary, NC (US)

(73) Assignee: EMC Corporation, Hopkinton, MA (US)

( * ) Notice: Subject to any disclaimer, the term of this patent is extended or adjusted under 35 U.S.C. 154(b) by 621 days.

(21) Appl. No.: 12/966,415

(22) Filed: Dec. 13, 2010

(51) Int. Cl.
*G06F 13/00* (2006.01)
*G06F 12/00* (2006.01)

(52) U.S. Cl.
USPC .......................................... 710/104; 711/114

(58) Field of Classification Search
None
See application file for complete search history.

(56) References Cited

U.S. PATENT DOCUMENTS 7,502,669 B1   3/2009  Evans et al.
2007/0288693 A1*  12/2007  Rajan et al. ................... 711/114

OTHER PUBLICATIONS

"EMC Celerra NX4," EMC Corporation, Data Sheet, 2008.
"EMC CLARiiON CX Series," EMC Corporation, Data Sheet, 2004.

* cited by examiner

*Primary Examiner* — Hyun Nam
(74) *Attorney, Agent, or Firm* — BainwoodHuang (57) ABSTRACT

A method for adding file based storage hardware to a block based storage system includes detecting, by the file based storage hardware, an electrical coupling between the file based storage hardware and the block based storage system, the block based storage system having a set of logical units (LUs) predefined as file based storage hardware specific LUs. The method includes forwarding, by the file based storage hardware, an initiator record to the block based storage system, the initiator record configured to control access by the file based storage hardware to data stored by the block based storage system and the initiator record having a file based storage hardware specific identifier. The method includes, following the block based storage system associating the initiator record having the file based storage hardware specific identifier with the predefined file based storage hardware specific LUs, establishing a communication path with the block based storage system.

20 Claims, 3 Drawing Sheets

AUTOMATED ADDITION OF FILE BASED HARDWARE AND FILE BASED ACCESS SERVICES IN A DATA STORAGE SYSTEM

BACKGROUND

A typical data storage system stores and retrieves data for one or more external host devices. Conventional data storage systems typically include processing circuitry and a set of disk drives electrically coupled to the processing circuitry. The processing circuitry includes one or more ports, such as Ethernet ports, that allow the host devices to connect to the processing circuitry. The processing circuitry is typically configured to perform load and store operations on the set of disk drives on behalf of the host devices.

In certain cases, an enterprise can utilize different types of storage systems to form a complete data storage environment. In one arrangement, the enterprise can utilize both a block based storage system, such as a CLARiiON™ system (produced by EMC Corporation, Hopkinton, Mass.), and a file based storage hardware, such as a Celerra™ system (produced by EMC Corporation, Hopkinton, Mass.). In such an arrangement, typically the file based storage hardware operates as a front-end to the block based storage system such that the file based storage hardware and the block based storage system form a unified storage system.

SUMMARY

As indicated above, an enterprise can utilize both file based storage hardware and a block based storage system as part of a complete data storage environment. In the case where the enterprise includes only a block based storage system, the enterprise can upgrade the block based system to include a file based system. However, in order to upgrade the system, the enterprise must work through an upgrade procedure as typically performed by a system manufacturer's representative.

During the upgrade procedure, with the block based storage system having already been established in the enterprise, the representative initially installs the file based storage hardware components in a rack enclosure and connects the hardware components using electrical cabling. The representative then manually allocates disk space on the block based storage system specifically for use by the file based storage hardware and, once allocated, configures both the disk space and access to the disk space for the file based storage hardware. Next, the representative inserts physical media, such as DVD media which contains a file based storage hardware installation process, into a control station of the file based storage hardware where the control station is configured to monitor and manage the file based storage system. Subsequently, the representative physically connects the file based storage hardware and another client computer, such as by a physical serial cable, to initiate, monitor, and drive the installation process, thereby allowing installation of the file based storage hardware as part of the block based storage system.

As part of the installation procedure, the installation process generates and provides, via the control station, a series of configuration steps. The representative is required to manually iterate through the steps to specify a configuration of the file based storage hardware and to provide initiator records, such as the combination of an initiator (e.g., a port on a network interface card (NIC) or Small Computer System Interface Host Bus Adaptor (SCSI HBA) that issues input/output (I/O) requests to a target) and a port on a storage processor that together define a unique I/O path between the two systems, to the block based storage system to associate the file based storage hardware with the block based storage system. Once the representative has correctly answered the configuration questions, the installation process continues the installation procedure related to the block based storage system. Once the representative has completed installation of the file based storage hardware, the enterprise's storage manager can then configure the unified storage system for operation by creating Network File System (NFS) and Common Internet File System (CIFS) shares to store the enterprise's files.

While the upgrade procedure allows an enterprise with the ability to attach file based storage hardware to an existing block based storage system and to enable file based storage hardware services on the existing block based storage system, the conventional upgrade procedure suffers from a variety of deficiencies. For example, as indicated above, the installation procedure requires that an end user load physical media, such as DVD media which contains a file based storage hardware installation process, into a control station of the file based storage hardware, which requires the user to keep track of the physical media and which is time consuming.

Also, as indicated above, the installation procedure requires that an end user manually allocate disk space on the block based storage system specifically for use by the file based storage hardware, which is a time consuming process and is potentially error prone where the errors may not be identified until much later in the installation procedure. Additionally, such allocation effectively steals from the pool of available block based LUNs. For instance, assume a CLARiiON™ block based storage system supports 1024 LUNs and Celerra™ file based storage hardware uses approximately 6 of those LUNs specifically for use by the file based storage hardware. Accordingly, the block based storage system, in actuality, only has 1018 LUNs available for use. For those customers that want to exercise the maximum configuration of the block based storage system will be unable to do so.

The procedure further requires the representative physically connects his computer device or laptop to the control station using a serial line. Accordingly, the representative is required to remain in proximity to the computer device during the installation procedure, typically in a location that is loud and uncomfortable. After that, the representative is required to correctly answer a series of questions, via the computer device, to specify a configuration of the file based storage hardware which can also be time consuming as well as error prone. Furthermore, the upgrade procedure requires the participation of a system manufacturer's representative, which can be costly to the enterprise.

By contrast to previous approaches, embodiments of the invention relate to the automated addition of file based hardware and file based access services in a data storage system. In the case where an enterprise upgrades a block based storage system to include file based storage hardware, upon connection to the block based storage system and following power-up, the file based storage hardware automatically detects attachment to the block based storage system and automatically installs file based storage hardware operation instructions without requiring intervention by an end user. For example, following connection to the block based storage system, the file based storage system receives from the block based storage system initial operation instructions, such as bootable bit images, for a portion of the file based storage hardware, such as a storage processor or data mover. This automated process eliminates the need for an end user to boot the data mover from media, such as a DVD, having the appropriate revision of the initial operation instructions. In one arrangement, the bootable bit image enables the data mover hardware to boot into an automated mode that allows a control station associated with the file based storage hardware to automatically complete a file based storage hardware installation process. For example, the control station is preconfigured with boot strap operating instructions that, when executed by the control station, causes the control station to detect the automated nature of the file based storage hardware installation process and access the data mover over a private internal management network and execute the installation process.

In one arrangement, prior to connection to the file based storage hardware, the block based storage system is configured to retrieve initial operation instructions, such as bootable bit images, for a portion of the file based storage hardware, such as the storage processor or data mover, from an external data server using a Non-Disruptive Upgrade (NDU) mechanism. By leveraging the NDU mechanism to deposit the initial operation instructions onto a predefined file based storage hardware specific section of one or more logical units of the block based storage system, the block based storage system maintains an up-to-date revision of the initial operation instructions, thereby minimizing end user version monitoring and maintenance of the initial operation instructions. Additionally, use of the predefined file based storage hardware specific LUs with the block based storage system eliminates the need for an end user to manually allocate disk space on the block based storage system specifically for use by the file based storage hardware, thereby saving time and effort during the installation process. Additionally, the allocated disk space on the block based storage system specifically for use by the file based storage hardware does not count against, or take away from, the total number of LUNs available to the block based storage system.

In one arrangement, a method for adding a file based storage hardware to a block based storage system includes detecting, by the file based storage hardware, an electrical coupling between the file based storage hardware and the block based storage system, the block based storage system having a set of logical units (LUs) predefined as file based storage hardware specific LUs. The method includes forwarding, by the file based storage hardware, an initiator record to the block based storage system, the initiator record configured to control access by the file based storage hardware to data stored by the block based storage system and the initiator record having a file based storage hardware specific identifier. The method includes, following the block based storage system associating the initiator record having the file based storage hardware specific identifier with the predefined file based storage hardware specific LUs, establishing, by the file based storage hardware, a communication path with the block based storage system.

In one arrangement, a method for adding a file based storage hardware to a block based storage system includes detecting, by the block based storage system, an electrical coupling between the block based storage system and the file based storage hardware, the block based storage system having a set of logical units (LUs) predefined as file based storage hardware specific LUs. The method includes receiving, by the block based storage system, an initiator record from the file based storage hardware, the initiator record configured to control access by the file based storage hardware to data stored by the block based storage system and the initiator record having a file based storage hardware specific identifier. The method includes associating, by the block based storage system, the initiator record having the file based storage hardware specific identifier with the predefined file based storage hardware specific LUs to allow the file based storage hardware to establish a communication path with the block based storage system.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Embodiments of the invention relate to the automated addition of file based hardware and file based access services in a data storage system. In the case where an enterprise upgrades a block based storage system to include file based storage hardware, upon connection to the block based storage system and following power-up, the file based storage hardware automatically detects attachment to the block based storage system and automatically installs file based storage hardware operation instructions without requiring intervention by an end user. For example, following connection to the block based storage system, the file based storage system receives from the block based storage system initial operation instructions, such as bootable bit images, for a portion of the file based storage hardware, such as a storage processor or data mover. This automated process eliminates the need for an end user to boot the data mover from media, such as a DVD, having the appropriate revision of the initial operation instructions. In one arrangement, the bootable bit image enables the data mover hardware to boot into an automated mode that allows a control station associated with the file based storage hardware to automatically complete a file based storage hardware installation process. For example, the control station is preconfigured with boot strap operating instructions that, when executed by the control station, causes the control station to detect the automated nature of the installation process and access the data mover over a private internal management network to execute the file based storage hardware installation process.

In one arrangement, prior to connection to the file based storage hardware, the block based storage system is configured to retrieve initial operation instructions, such as bootable bit images, for a portion of the file based storage hardware, such as the storage processor or data mover, from an external data server using a non-disruptive upgrade (NDU) mechanism. By leveraging the NDU mechanism to deposit the initial operation instructions onto a predefined file based storage hardware specific section of one or more logical units of the block based storage system, the block based storage system maintains an up-to-date revision of the initial operation instructions, thereby minimizing end user version monitoring and maintenance of the initial operation instructions. Additionally, use of the predefined file based storage hardware specific LUs with the block based storage system eliminates the need for an end user to manually allocate disk space on the block based storage system specifically for use by the file based storage hardware, thereby saving time and effort during the installation process. Also with this approach, all of the software that is running on the components that make up the storage system are verified to be compatible and appropriate, by contrast to conventional storage systems.

Figure 1:
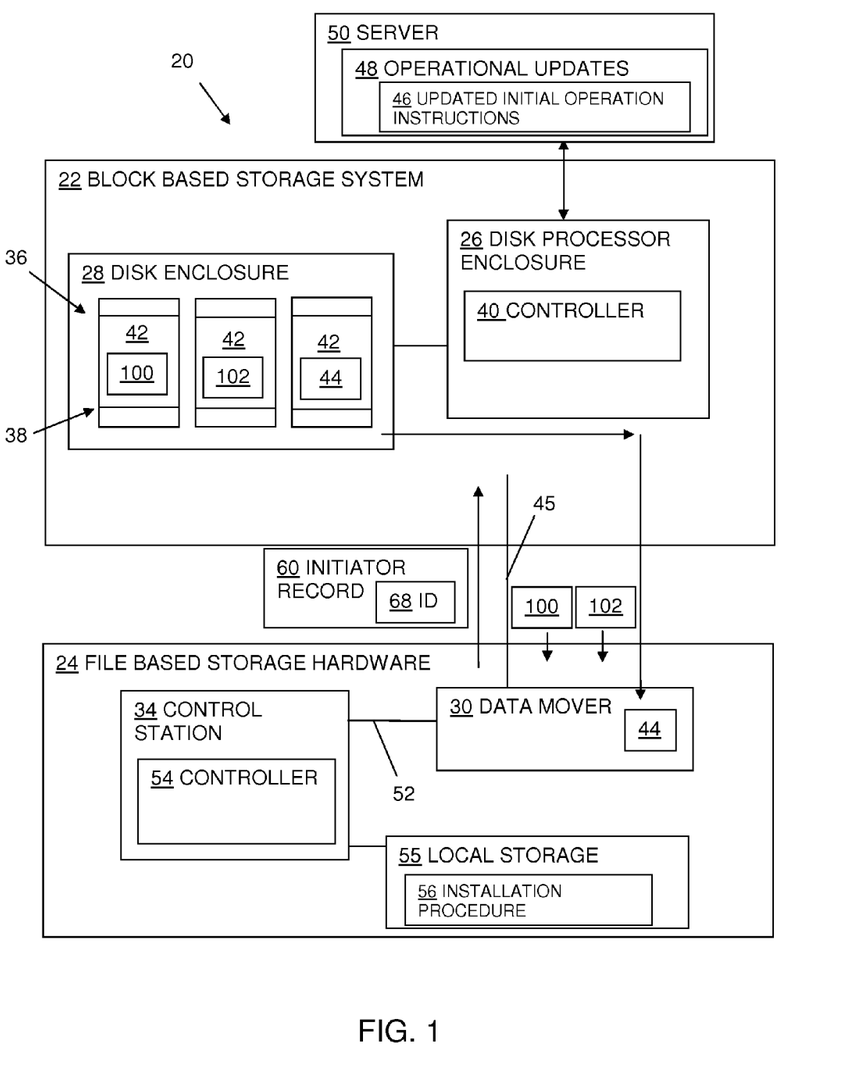
FIG. 1 illustrates a schematic representation of file based storage hardware disposed in electrical communication with a block based storage system.

FIG. 1 illustrates an example arrangement of a data storage system 20, such as a unified data storage system used by an enterprise. As shown, the data storage system 20 includes a block based storage system 22 and file based storage hardware 24. While the block based storage system 22 can be configured in a variety of ways, in one arrangement, the block based storage system 22 is configured as a storage area network (SAN), such as a CLARiiON™ system, as produced by EMC Corporation of Hopkinton, Mass. While the file based storage hardware 24 can be configured in a variety of ways, in one arrangement, the file based storage hardware 24 is configured as a network attached storage (NAS) system, such as a Celerra™ system produced by EMC Corporation of Hopkinton, Mass., configured as a header to the block based storage system 22.

The block based storage system 22, in one arrangement, includes one or more disk processor enclosures, given generally as 26, and one or more disk enclosures 28 electrically coupled to the disk processor enclosure 26. Each of the disk enclosures 28 includes an array of storage 36, such as disk drives or flash drives. For example, each of the disk enclosures 28 includes several disk drives 36 operable to store data received from a host device or to provide data requested from the host device. Typically, these disk drives 36 are configured with multiple logical units (LUs). For example, the array of disk drives 36 can be formatted as a redundant array of independent disks (RAID), partitioned into distinct logical storage volumes or logical units (LUs) 38. The LUs 38 are configured to store a data file as a plurality of blocks, such as striped across the LUs 38.

The disk processor enclosure or DPE 26 includes one or more controllers or storage processors 40 configured to control certain functions of the block based storage system 22. For example, the controller 40 is configured to perform load and store operations on the memory units 36 of the disk enclosures 28 on behalf of a host device (not shown).

In one arrangement, the controller 40 is configured to define a set of LUs 42 of the block based storage system 22 as file based storage hardware specific LUs. As indicated above, when an enterprise adds file based storage hardware to a block based storage system, a representative then manually allocates disk space on the block based storage system specifically for use by the file based storage hardware. By contrast, when the block based storage system 22 of FIG. 1 is initially powered on by a user, the controller 40 allocates a set of LUs 42 as being reserved for use by file based storage hardware only. For example, in the case where the block based storage system 22 is configured as a CLARiiON™ system, the controller 40 allocates the set of LUs 42 as being reserved specifically for use by a Celerra™ system. The controller 40 performs such an allocation during an array initialization procedure and regardless of an actual connection being present between the block based storage system 22 and the file based storage hardware 24. Instead, the allocation takes place in the anticipation that, at some point, an enterprise will attach file based storage hardware 24 to the block based storage system 22. In the event that the enterprise does not attach file based storage hardware 24 to the block based storage system 22, the file based storage hardware specific LUs 42 remain present within the disk drives 36 yet not accessible to another attached host device.

In one arrangement, the set of LUs 42 are preconfigured with initial operation instructions 44 used by a portion of the file based storage system 24, such as a data mover 30 during an initiation procedure. For example, a manufacturer configures the set of LUs 42 with bootable bit images 44 that, when provided to the data mover 30 by the controller 40, allows the data mover 30 to boot and begin operation.

While the set of LUs 42 can be preconfigured with the initial operating instructions 44 by the manufacturer, in one arrangement, prior to connection to the file based storage hardware, the controller 40 is configured to retrieve updated initial operation instructions 46 from an external data server using a non-disruptive upgrade (NDU) mechanism. For example, assume the block based storage system 22 is a CLARiiON™ system. The CLARiiON™ system is configured to receive operational updates 48 from an external server. While the operational updates 48 are typically configured to update the CLARiiON™ system, in one arrangement, the operational updates 48 include updated initial operation instructions 46 specific to the file based storage system 24, such as a Celerra™ system. By leveraging the NDU mechanism to deposit the updated initial operation instructions 46 onto the set of LUs 42 as the initial operating instructions 44, the controller 40 of the block based storage system 22 maintains an up-to-date revision of the initial operation instructions 44, thereby minimizing end user version monitoring and maintenance of the initial operation instructions for the data mover 30.

The file based storage hardware 24 includes one or more storage processors, such as data movers, given as 30, and a control station 34 disposed in electrical communication with the data mover 30. While the data mover 30 and control station 34 can communicate with each other in a variety of ways, in one arrangement, the data mover 30 and control station 34 communicate with each other via a network connection 52, such as a local area network connection.

The data mover 30 is configured as one or more computerized devices, such as file servers, that provide end user devices (not shown) with networked access (e.g., NFS and CIFS facilities) to the block based storage system 22. As described above, the data mover 30 is configured to receive initial operating instructions 44 or updated initial operation instructions 46 from the block based storage system 22 once connected to the block based storage system 22 and powered.

The control station 34, in one arrangement, is a computerized device having a controller 54, such as a memory and one or more processors. The control station 34 is configured to provide hardware and file system management, configuration, and maintenance capabilities to the data storage system 20. In one arrangement, the control station 34 includes boot strap operating instructions, either as stored on a local storage device or as part of the controller 54 that, when executed by the controller 54 following connection of the data mover 30 to the block based storage system 22, causes the control station 34 to detect the automated nature of the file based storage hardware installation process and access the data mover over a private internal management network 52 and execute the file based hardware installation process.

Figure 2:
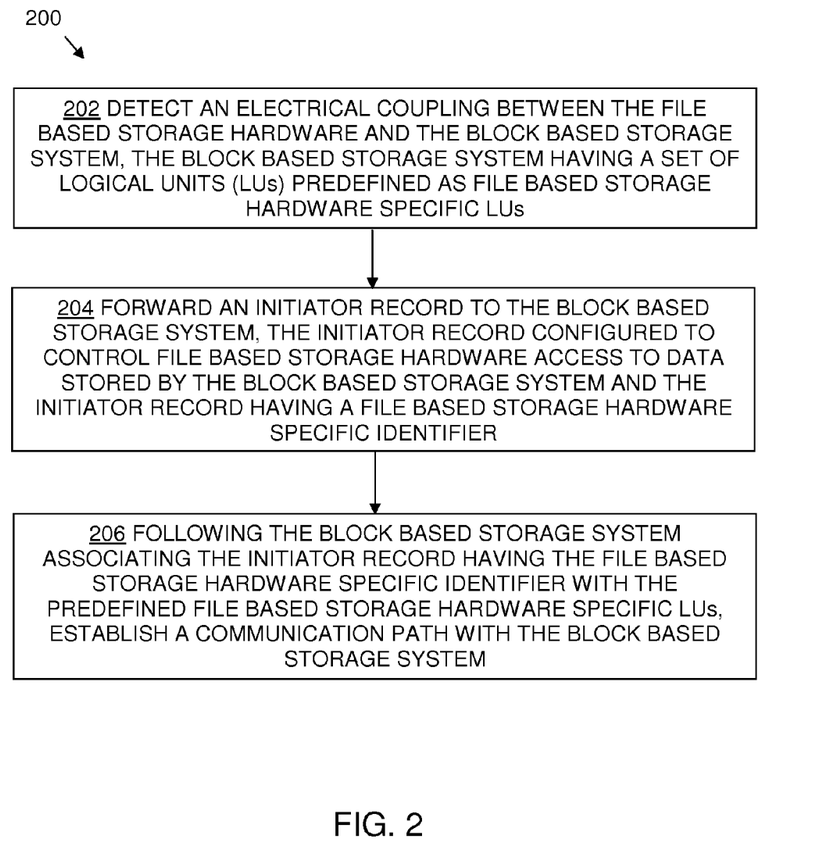
FIG. 2 is a flowchart that illustrates a procedure performed by the block based storage system of FIG. 1.

FIG. 2 is a flowchart 200 that illustrates a procedure performed by the file based storage hardware 24 when an end user adds the file based storage hardware 24 to the block based storage system 22.

In step 202, the file based storage hardware 24 detects an electrical coupling between the file based storage hardware 24 and the block based storage system 22, the block based storage system 22 having a set of logical units (LUs) 42 predefined as file based storage hardware specific LUs. In one arrangement and with reference to FIG. 1, during an installation procedure, an end user electrically couples the control station 34 to the data mover 30 via a network connection 52 and electrically couples the data mover 30 to a disk processor enclosure 26 via one or more cables 45. For example, the end user can connect a first cable between the data mover 30 and a fiber channel port of a first storage processor (SPA) and a second cable between the data mover 30 and a fiber channel port of a second data processor (SPB). In the case where the block based storage system 22 is operational, and following powering on of the connected control station 24 and the data mover 30, the file based storage hardware 24 can detect electrical coupling with the block based storage system 22 in a variety of ways. For example, the data mover 30 can receive a connection message transmitted from the disk processor enclosure 26 where the connection message indicates the presence of an electrical communication coupling between the block based storage system 22 and the file based storage hardware 24.

Returning to FIG. 2, in step 204, the file based storage hardware 24 forwards an initiator record 60 to the block based storage system 22, the initiator record 60 configured to control file based storage hardware 24 access to data stored by the block based storage system 22 and the initiator record 60 having a file based storage hardware specific identifier 62. In one arrangement, as will be described below, the data mover 30 provides the initiator record 60 to the disk processor enclosure 26.

In one arrangement, with reference to FIG. 1, following detection of the electrical coupling 45 between the block based storage system 22 and the file based storage hardware 24, the data mover 30 generates an initiator record 60 to register the data mover 30 (e.g., a host bus adaptor associated with the data mover 30) with the block based storage system 22. During the initiator record generation process, the data mover 30 includes the file based storage hardware specific identifier 62 as part of the initiator record 60. The file based storage hardware specific identifier 62 identifies the file based storage hardware to the block based storage system 22 as being of a specific type, such as corresponding to the set of reserved LUs 42. For example, assume the case where the file based storage hardware 24 is configured as a Celerra™ system. In such a case, the file based storage hardware specific identifier 62 identifies the data mover 30 of the file based storage hardware 24 as being part of a Celerra™ system.

Once the block based storage system 22 has associated the data mover 30 with the set of reserved LUs 42, the controller 40 of the block based storage system 22 provides the data mover 30 with access to initial operation instructions 44. For example, as indicated above, the LUs 42 are preconfigured with initial operation instructions 44, or updated initial operating instructions 46, such as bootable bit images. Upon upon the association of the data mover 30 with the set of reserved LUs 42, the controller 40 allows the data mover 30 to automatically access the initial operation instructions 44 from the set of LUs 42 over the communication path established using the initiator record 60. For example, the data mover 30 is configured to look for a boot image on a specific connected storage device or LU 42. Because the block based storage system 22 has already exposed that LU 42 to the data mover 30 and that LU 42 contains the initial operating instructions 44, the data mover 30 can then retrieve the initial operation instructions 44 to initiate the boot up and begin operation. Following execution of the initial operating instructions 44, and once in an operational state, the data mover 30 is configured to provide additional information regarding the file based storage hardware 24. For example, the control station 34 executes or boots an installation procedure 56 stored on a local storage device 55, such as a disk drive associated with the control station 34. While executing the installation procedure, the control station 34 automatically identifies the preconfigured LUs 42, provides itself with a name, and is assigned an IP address, among other functions, to allow file based access to the block based storage system 22. The data mover 30 receives this identification information from the control station 34 and forwards the identification information to the controller 40 of the block based storage system 22. While the data mover 30 can provide the identification information in a variety of ways, in one arrangement, the data mover 30 provides the identification information as metadata.

Returning to FIG. 2, in step 206, following the block based storage system 22 associating the initiator record 60 having the file based storage hardware specific identifier 62 with the predefined file based storage hardware specific LUs 42, the file based storage hardware 24 establishes a communication path with the block based storage system 22.

For example, with reference to FIG. 1, when the controller 40 of the disk processor enclosure 26 receives the initiator record 60, the controller 40 extracts the file based storage hardware specific identifier 62 (e.g., the metadata) from the initiator record 60. Based upon a correspondence between the identifier 62 and the predefined file based storage hardware specific LUs 42, the controller 40 automatically associates the initiator record 60 with the preconfigured LUs 42. With such an association, the data mover 30 can identify disk space on the block based storage system 22 to be utilized by the file based storage hardware 24 and allow the file based storage hardware to establish a communication path with (i.e., access) the preconfigured LUs 42 of the block based storage system 22.

The above-described process relates to the automated addition of file based hardware 24 and file based access services to a block based storage system 22. The automated process eliminates the need for an end user to boot the data mover from media, such as a DVD, having the appropriate revision of the initial operation instructions. Additionally, the automated process minimizes or eliminates the necessity of utilizing a system manufacturer's representative to upgrade the data storage system 20 which can reduce the overall associated costs for the enterprise.

In one arrangement, prior to establishing communication path with the block based storage system 22, the file based storage hardware 24, specifically the control station 34, can automatically execute additional procedures to allow the installation to proceed without requiring user intervention.

For example, the control station 34 is configured to automatically execute a control station self update to identify synchronization between an operating system version executed by the control station 34 and an operating system executed by the block based storage system 22. As indicated above, the block based storage system 22 is configured to receive operational updates 48 from an external server on a regular basis. In one arrangement, the operational updates 48 provide an updated version of the operating system executed by the block based storage system 22, in addition to providing updated initial operating instructions 46. By contrast, in conventional systems when a control station ships from the manufacturer the control station's local hard drive includes a preinstalled control station operating system. Accordingly, if the conventional control system were connected to the block based storage system 22, there exists the possibility that the version of the control station's operating system will not be the same as (i.e., will be out of synchronization with) the operating system of the block based storage system 22. This lack of synchronization can lead to errors during operation of the system 20.

Figure 3:
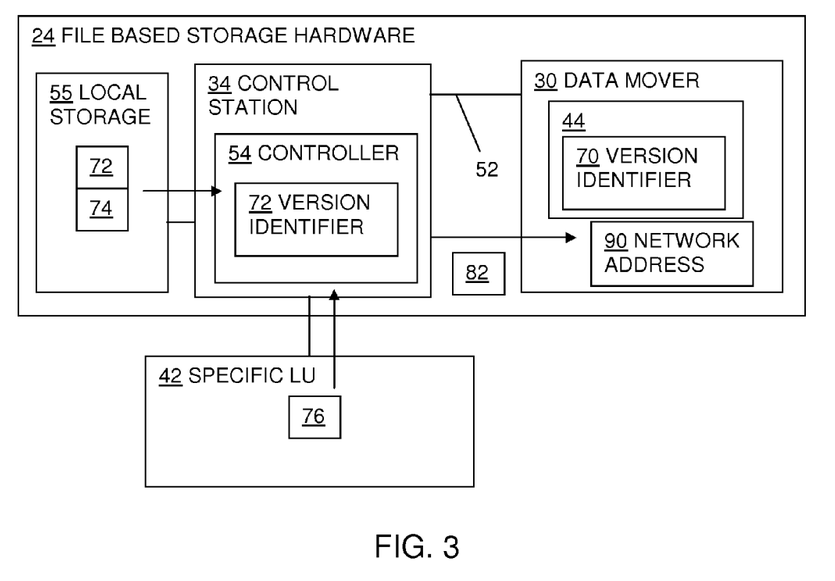
FIG. 3 illustrates a schematic representation of the file based storage hardware of FIG. 1.

By contrast to conventional control stations, and with reference to FIG. 3, the control station 34 is configured to automatically update the version of its operating system based upon the operating system version executed by the block based storage system 22. For example, during operation, the block based storage system 22 provides initial operating instructions 44 to the data mover 30. The initial operating instructions 44 include a version identifier 70 that identifies a version of the operating system executed by the disk processor enclosure 26. For example, assume the version identifier 70 indicates that the version of the operating system executed by the disk processor enclosure 26 is Version 6. Furthermore, the control station 34 includes an operating system 74 having an associated version identifier 72. For example, assume the version identifier 72 indicates that the version of the operating system 74 executed by the control station 34 is Version 4.

During operation, when the control station 34 executes the operating system 74 from the local storage 55, the control station 34 retrieves a version identifier 72 associated with the operating system 74 and retrieves the version identifier 70 associated with the initial operation instructions 44 executed by the data mover 30. Based upon a comparison to the version identifier 70 associated with the block based storage system's operating system (i.e. Version 6) and the version identifier 72 associated with the control station's operating system 74 (i.e., Version 4). In the present example, based upon the comparison, the control station 34 detects the absence of compatibility between the operating system 74 executed by the control station 34 and the initial operation instructions 44 executed by the data mover 30. Because of the lack of compatibility, the control station 34 retrieves, such as from a file based storage hardware specific LU 42, an operating system 76 having a version identifier (i.e. Version 6) that corresponds to the version identifier 70 (i.e., Version 6) associated with the initial operation instructions 44 executed by the data mover 30.

By performing the aforementioned control station self update, the control station 34 is configured to automatically provide synchronization between an operating system version executed by the control station 34 and an operating system executed by the block based storage system. The control station 34, therefore, is configured to minimize or prevent potential compatibility issues between the file based storage hardware 24 and the block based storage system 22 while limiting the involvement of the end user in the process.

In another example, the control station 34 is configured to automatically assign a network address, such as an Internet Protocol (IP) address to the data mover 30 to provide the data mover 30 with the ability to communicate with other components of the data storage system 20.

For example, during a boot process, the data mover 30 is configured to detect a port number associated with the controller or storage processor 40 to which it is connected. Based upon the detected port number, the data mover 30 assigns a temporary network address to the interface between the data mover 30 and the control station 34. The control station 34, in turn, detects a presence of the data mover 30 as part of the file based storage hardware 24 by transmitting request messages or packets 82 within a predetermined address range (i.e., pinging). For example, in the case where the control station 34 receives a response message from the data mover 30 in response to the request messages 82, the control station 34 detects the data mover 30 as being present on a local area network connection or private internal management network connection.

In response, the control station 34 provides an assigned network address 90 to the data mover 30, the assigned network address 90 replacing a temporary network address associated with the data mover 30 within the predetermined address range. The data mover 30 utilizes the assigned network address, such as an assigned IP address, as its address on the local area or private internal management network. By implementing such a process, the file based storage hardware 24 minimizes the amount of information provided, and the time required, by an end user performing the installation of the file based storage hardware 24.

As indicated above, once connected to the block based storage system 22 and powered on, the control station 34 executes or boots an installation procedure 56 stored on a local storage device 55 to establish a communication path with the block based storage system 22. However, in certain circumstance, in order to gain administrative access to the block based storage system 22, a conventional control station is required to utilize secure credentials from the block based storage system 22, such as provided manually by an end user. In the case where the control station 34 does not receive the secure credentials, the control station cannot proceed in the installation procedure.

As indicated above, the procedure performed by the file based storage hardware 24 occurs when an end user adds a new control station 34 to the block based storage system 22. In one arrangement, the procedure performed by the file based storage hardware 24 occurs when an end user replaces an existing, faulty control station with a new control station relative to the block based storage system 22.

For example, with reference to FIG. 1, the set of file based storage hardware specific LUs 42 are preconfigured with configuration information 102 associated with a previously installed control station. For example, an existing control station can store the configuration information 102 on the set of file based storage hardware specific LUs 42 following installation of the control station as part of the data storage system 20. In the case where the existing control station becomes faulty, an end user replaces the existing faulty control station with a functional, hardware identical (i.e., an upgraded) control station 34. During the replacement procedure, the end user connects the upgraded control station to the data mover 30 via connection 52 and powers on the control station 34. As the upgraded control station boots from a pre-imaged bootstrap partition on the local storage 55, the control station 34 detects the presence of the configuration information 102 associated with the previously installed control station on the set of file based storage hardware specific LUs 42. In response, the control station 34 retrieves the configuration information 102 associated with the previously installed control station from the set of file based storage hardware specific LUs 42 and restores the configuration of the previous control station, without requiring any user input. With such restoration, the control station 34 is automatically configured to communicate with the block based storage system 22 based upon the configuration information associated with the previously installed control station.

While various embodiments of the invention have been particularly shown and described, it will be understood by those skilled in the art that various changes in form and details may be made therein without departing from the spirit and scope of the invention as defined by the appended claims.

As indicated above, the configuration of the block based storage system 22 and the file based storage hardware 24 allow for the automated addition of the file based hardware 24 to the block based storage system 22 with minimal involvement from an end user. In one arrangement, the end user can monitor the automated installation process. For example, the control station 34 electrically communicates with a user's computer device or laptop which is configured with a user interface based monitoring application. The application allows the end user to monitor the progress of the automated installation, such as by a graphical user interface, and is configured to identify errors and provide recommendations for fixing the errors.

What is claimed is:

1. A method for adding file based storage hardware to a block based storage system, comprising:
    detecting, by the file based storage hardware, an electrical coupling between the file based storage hardware and the block based storage system, the block based storage system having a set of logical units (LUs) predefined as file based storage hardware specific LUs;
    forwarding, by the file based storage hardware, an initiator record to the block based storage system, the initiator record configured to control file based storage hardware access to data stored by the block based storage system and the initiator record having a file based storage hardware specific identifier; and
    following the forwarding of the initiator record to the block based storage system, associating the file based storage hardware specific identifier with the predefined file based storage hardware specific LUs, and establishing, by the file based storage hardware, a communication path with the block based storage system.

2. The method of claim 1, comprising, following detection of the electrical coupling between the file based storage hardware and the block based storage system, receiving, by a data mover of the file based storage hardware, initial operation instructions from the file based storage hardware specific LUs, the block based storage system having the initial operation instructions pre-imaged on the file based storage hardware specific LUs.

3. The method of claim 2, comprising:
    comparing, by a control station of the file based storage hardware, a version identifier associated with an operating system executed by the control station with a version identifier associated with the initial operation instructions executed by the data mover; and
    in response to detecting an absence of compatibility between the operating system executed by the control station and the initial operation instructions executed by the data mover, retrieving, by the control station, an operating system having a version identifier that corresponds to the version identifier associated with the initial operation instructions executed by the data mover.

4. The method of claim 2, comprising:
    detecting, by the control station of the file based storage hardware, a presence of the data mover as part of the file based storage hardware in response to transmitting request messages within a predetermined address range; and
    providing, by the control station, an assigned network address to the data mover, the assigned network address replacing a temporary network address associated with the data mover within the predetermined address range.

5. The method of claim 1, wherein establishing, by the file based storage hardware, the communication path with the block based storage system comprises automatically executing, by a control station of the file based storage hardware, an installation procedure to establish the communication path for communication with the block based storage system.

6. The method of claim 5, wherein automatically configuring, by the file based storage hardware, the control station of the file based storage hardware to communicate with the block based storage system comprises:
    receiving, by the control station, configuration information stored as part of the file based storage hardware specific LUs, the configuration information associated with a faulted control station; and
    configuring, by the file based storage hardware, the control station to communicate with the block based storage system based upon the configuration information associated with the faulted control station.

7. File based storage hardware, comprising:
    a control station;
    a data mover disposed in electrical communication with the control station and with a block based storage system, the file based storage hardware configured to:
    detect an electrical coupling between the file based storage hardware and the block based storage system, the block based storage system having a set of logical units (LUs) predefined as file based storage hardware specific LUs;
    forward an initiator record to the block based storage system, the initiator record configured to control file based storage hardware access to data stored by the block based storage system and the initiator record having a file based storage hardware specific identifier; and
    following forwarding of the initiator record to the block based storage system, associating file based storage hardware specific identifier with the predefined file based storage hardware specific LUs, and establish a communication path with the block based storage system.

8. The file based storage hardware of claim 7, wherein, following detection of the electrical coupling between the file based storage hardware and the block based storage system, the data mover is configured to receive initial operation instructions from the file based storage hardware specific LUs, the block based storage system having the initial operation instructions pre-imaged on the file based storage hardware specific LUs.

9. The file based storage hardware of claim 8, wherein the control station is configured to:
    compare a version identifier associated with an operating system executed by the control station with a version identifier associated with the initial operation instructions executed by the data mover; and
    in response to detecting an absence of compatibility between the operating system executed by the control station and the initial operation instructions executed by the data mover, retrieve an operating system having a version identifier that corresponds to the version identifier associated with the initial operation instructions executed by the data mover.

10. The file based storage hardware of claim 8, wherein the control station is configured to:
    detect a presence of the data mover as part of the file based storage hardware in response to transmitting request messages within a predetermined address range; and
    provide an assigned network address to the data mover, the assigned network address replacing a temporary network address associated with the data mover within the predetermined address range.

11. The file based storage hardware of claim 7, wherein when establishing a communication path with the block based storage system, a control station of the file based storage hardware is configured to automatically execute an installation procedure to establish the communication path for communication with the block based storage system.

12. The file based storage hardware of claim 11, wherein when being automatically configured to communicate with the block based storage system, the control station is configured to:
receive configuration information stored as part of the file based storage hardware specific LUs, the configuration information associated with a faulted control station; and
configure the control station to communicate with the block based storage system based upon the configuration information associated with the faulted control station.

13. A method for adding file based storage hardware to a block based storage system, comprising:
detecting, by the block based storage system, an electrical coupling between the block based storage system and the file based storage hardware, the block based storage system having a set of logical units (LUs) predefined as file based storage hardware specific LUs;
receiving, by the block based storage system, an initiator record from the file based storage hardware, the initiator record configured to control file based storage hardware access to data stored by the block based storage system and the initiator record having a file based storage hardware specific identifier; and
associating, by the block based storage system, the file based storage hardware-specific identifier with the predefined file based storage hardware specific LUs to enable the file based storage hardware to establish a communication path with the block based storage system.

14. The method of claim 13, wherein in response to detecting the electrical coupling between the block based storage system and the file based storage hardware providing access, by the block based storage system, to initial operating instructions for a data mover of the file based storage hardware, the initial operation instructions pre-imaged on the file based storage hardware specific LUs.

15. The method of claim 14, comprising retrieving, by the block based storage system updated initial operation instructions from a storage location and wherein providing access, by the block based storage system, to initial operation instructions for the data mover of the file based storage hardware, comprises forwarding, by the block based storage system, updated initial operation instructions to the data mover of the file based storage hardware.

16. A block based storage system, comprising
a set of logical units (LUs) predefined as file based storage hardware specific LUs; and
a storage processor disposed in electrical communication with the set of LUs, the storage processor having a memory and a controller, the storage processor configured to:
detect an electrical coupling between the block based storage system and the file based storage hardware;
receive an initiator record from the file based storage hardware, the initiator record configured to control file based storage hardware access to data stored by the block based storage system and the initiator record having a file based storage hardware specific identifier; and
associate the file based storage hardware specific identifier with the predefined file based storage hardware specific LUs to enable the file based storage hardware to establish a communication path with the block based storage system.

17. The block based storage system of claim 16, wherein in response to detecting the electrical coupling between the block based storage system and the file based storage hardware, the storage processor is configured to provide access to initial operating instructions for a data mover of the file based storage hardware, the initial operation instructions pre-imaged on the file based storage hardware specific LUs.

18. The block based storage system of claim 17, wherein the storage processor is configured to:
retrieve block based storage system updated initial operation instructions from a storage location; and
when providing access to initial operation instructions to the data mover of the file based storage hardware, provide access to updated initial operation instructions to the data mover of the file based storage hardware.

19. The method of claim 1, wherein the file based storage hardware includes a physical media device; wherein the block based storage system includes an enclosure; and wherein detecting the electrical coupling between the file based storage hardware and the block based storage system includes:
electronically sensing physical installation of the physical media device into a device location defined by the enclosure of the block based storage system.

20. The method of claim 19, wherein electronically sensing physical installation of the physical media device locations includes:
detecting electrical communications between the physical media device and the block based storage system in response to a human connecting the physical media device to the block based storage systems using a physical cable.

* * * * *